Figure 1:
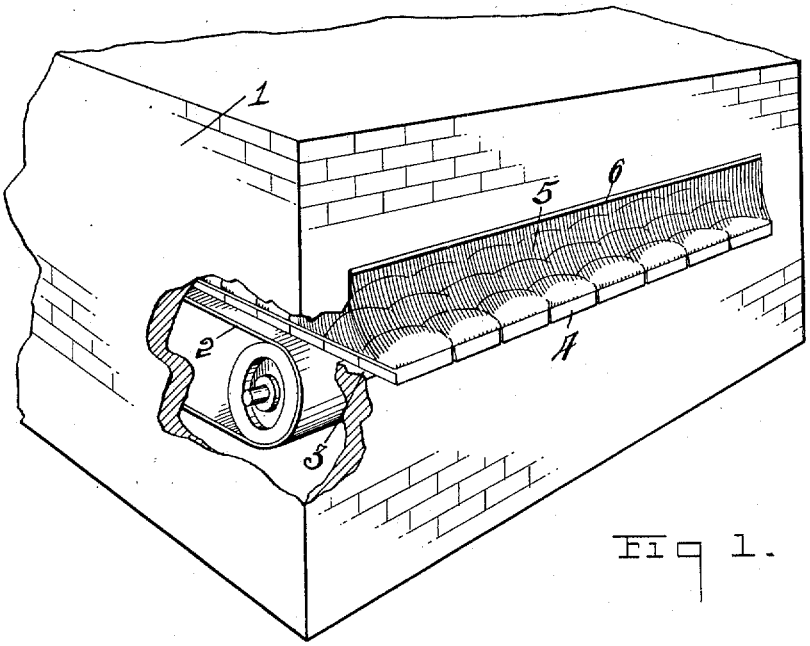

F. C. FULLER.

INSULATING SCREEN OR CURTAIN.

APPLICATION FILED SEPT. 19, 1921.

Reissued Jan. 24, 1922. 15,273.

INVENTOR.
Frederick C. Fuller,
By Owen Owen & Crampton,
Attys.

UNITED STATES PATENT OFFICE.

FREDERICK C. FULLER, OF TOLEDO, OHIO.

INSULATING SCREEN OR CURTAIN.

15,273. Specification of Reissued Letters Patent. Reissued Jan. 24, 1922.

Original No. 1,361,977, dated December 14, 1920, Serial No. 380,115, filed May 10, 1920. Application for reissue filed September 19, 1921. Serial No. 501,813.

*To all whom it may concern:*

Be it known that I, FREDERICK C. FULLER, a citizen of the United States, and a resident of Toledo, in the county of Lucas and State of Ohio, have made an Invention Appertaining to an Insulating Screen or Curtain; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to closure means for openings of ovens, furnaces, or the like, and has for its primary object the provision of a screen or curtain for use in connection with the inlet and outlet openings of baking ovens, particularly those of the traveling type, to effectually separate or insulate the interior from the exterior of the oven to retain steam, moisture and hot gases therein and at the same time automatically adjust itself to the passage of articles through the openings without uncovering the openings and without injury to soft articles passing therethrough.

In the economical and efficient baking of bread, it is necessary for the bread, immediately upon entering the oven, to be moistened with steam with which the oven is filled, and it is therefore highly important to retain this steam in the oven. If steam is not maintained in the oven the loaves of bread, or other articles to be baked, as soon as they enter the oven will be crusted or surface stiffened to such an extent by the dry oven heat as to prevent even expansion, resulting in an uneven, cracked and checked loaf. On the other hand, if the loaves enter an oven that is filled with steam or has a high humidity, the crust of the bread will remain soft and flexible allowing the bread to rise properly and uniformly, and the loaf will contain more moisture after it is baked, which is a very desirable feature. Numerous endeavors have been made to provide some means for preventing the escape of steam from the oven inlet and outlet openings, and particularly the former, as it is highly important to have a high degree of humidity in the oven at the inlet opening so that the loaves will be brought into contact with such humidity immediately upon entering the oven, but these endeavors, so far as I am aware, have failed due to the shape and size of the loaves.

The invention is fully described in the following specification, and while, in its broader aspect, it is capable of embodiments and use in numerous connections, a preferred embodiment thereof is illustrated in the accompanying drawings, in which,—

Figure 2:
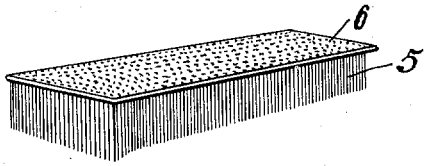

Figure 1 is a perspective view of the outlet end of a traveling baking oven, with a portion broken away, with the baked goods emerging from the oven outlet opening, and with the closure means embodying the invention associated with the opening, and Fig. 2 is a perspective view of the closure member removed from the opening.

Referring to the drawings, 1 designates a baking oven of the traveling type, 2 a traveling conveyer of any suitable form therein, 3 an opening of the oven through which bread loaves, or the like, pass into or from the oven, such opening being illustrated in the drawing as the outlet opening, and 4 pans containing the baked goods.

The screen or curtain employed to close the opening 3 and embodying the invention comprises a multiplicity of pliant members 5 preferably of string-like form suspended within the opening from the top thereof and extending to the bottom of the opening so as to cooperate to effectually close or insulate the interior from the exterior of the oven. The members 5 may be made of asbestos or other material suitable to withstand the action of the heat or other gases within the oven or chamber with which associated, and which material is of a nature not to injure the soft loaves, and in order to facilitate an insertion or removal of the screen from the opening the members 5 are preferably suspended from a plate 6 which is secured in any suitable manner in the top of the opening. The plate 6 may be perforated to permit the suspending of the members 5 therethrough or the members may be secured and suspended from the plate in any other suitable manner.

The screen or curtain in width is coextensive with the width of the opening 3 and may be of a length to extend through the opening and back into the oven or associated chamber any desired distance.

It is evident that when nothing is passing through the opening 3 the cords 5 comprising the curtain will hang to the bottom of the opening and serve to effectually close the same and that when articles are passing through the opening the curtain members will be moved out of obstructing relation thereto and will accommodate themselves to the shape of the article so as to cooperate with the articles to close the opening and prevent the escape of heat, steam or other gases therethrough.

It will be understood that the invention may be changed and modified in numerous respects without departing from the spirit of the claims and that it may be used in connection with any opening which it is desired to close and through which openings at the same time it may be desired to pass articles.

Having thus described my invention, what I claim as new, and desire to secure by Letters Patent, is,—

1. A curtain or screen for an opening of ovens, furnaces, or the like, comprising a plurality of pliant suspended members adapted to cooperate to close the opening and capable of withstanding a high heat and of displacement by articles passing through the opening without injury to the articles, the members filling an area which in two dimensions transversely thereof is greater than the thickness of a member.

2. The combination with means forming an oven or chamber having an opening therein for the passage of articles, of a closure for the opening including strands of flexible material disposed within the opening, the closure being of sufficient length, depth and width to insulate the interior of the oven or chamber from the exterior, the strands being capable of displacement by articles passing through the opening.

3. The combination with a baking oven having an opening therein through which articles may pass into or from the ovens, of a multiplicity of pliant members suspended within the opening and cooperating to close the opening against the passage of gases therethrough and to permit a passage of articles through the opening without uncovering the same and without injury to the articles.

4. The combination with the inlet or outlet of a baking oven of the traveling type, of a multiplicity of pliant members suspended within the opening and cooperating to close the opening against the passage of gases therethrough and to permit the passage of soft articles through the opening without uncovering the opening and without injury to the articles, the members filling an area which is coextensive with the width of the opening and extends a distance lengthwise through the opening.

5. The combination with the inlet or outlet opening of a baking oven of the traveling type, of a multiplicity of cordlike members of a material, such as asbestos, suspended within the opening from the top thereof and cooperating to effectually close the opening against the passage of gases therethrough and to permit the passage of soft articles through the opening without uncovering the opening and without injury to the articles.

6. The combination with means forming an oven or chamber and having an opening therein for the passage of articles, of a rigid member mounted within the upper portion of the opening, and a multiplicity of cordlike members suspended from the rigid member and cooperating to close the opening against the passage of gases therethrough and to permit the passage of articles therethrough.

7. The combination with a heating chamber having an opening therein through which articles may pass into or from the chamber, of a plurality of rows of pliant members suspended within the opening from the top thereof and extending across the same, the rows of pliant members cooperating to close the opening against the passage of gases therethrough and to permit the passage of articles through the opening without uncovering the same.

In testimony whereof I have hereunto signed my name to this specification.

FREDERICK C. FULLER.